United States Patent Office 2,790,563
Patented Apr. 30, 1957

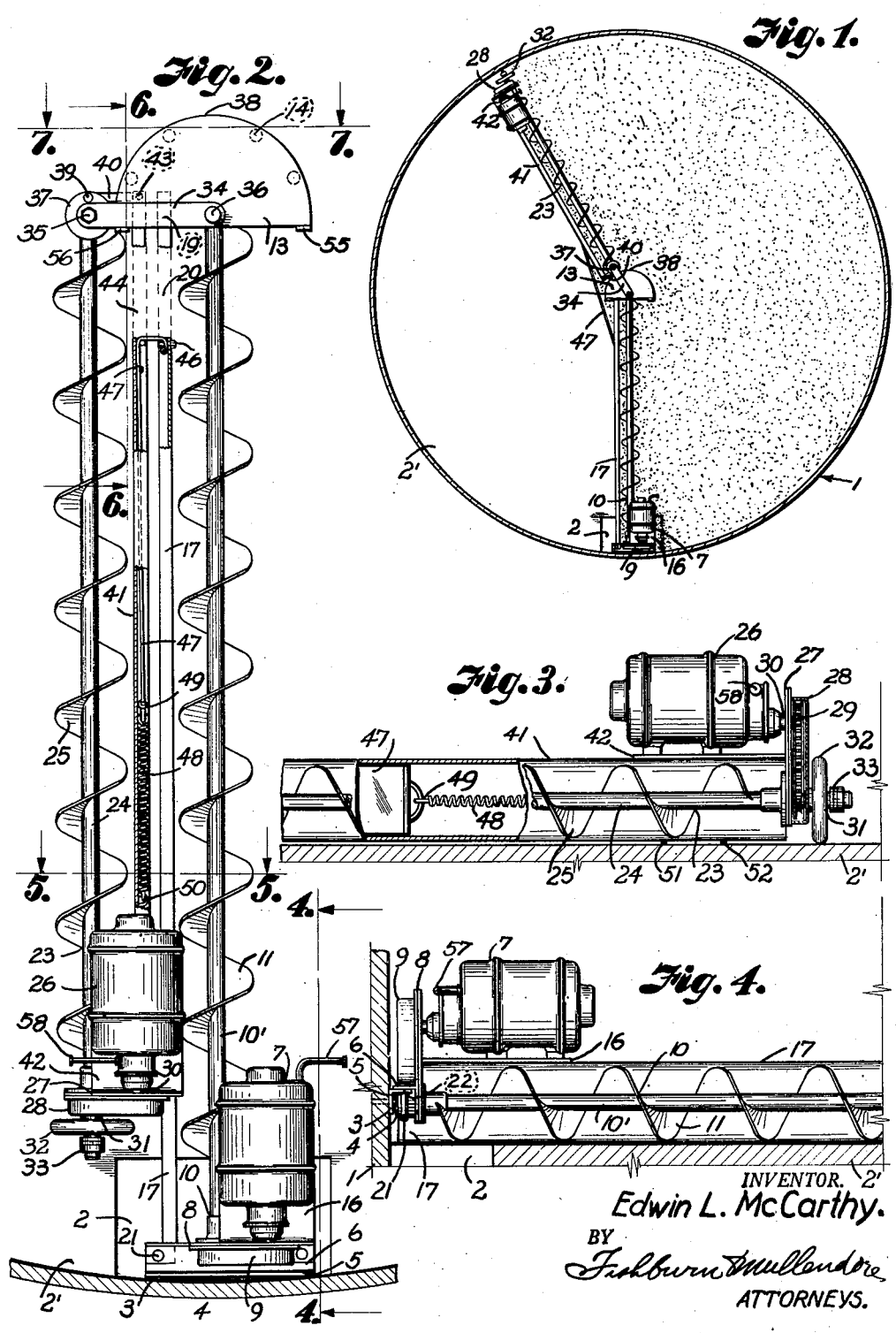

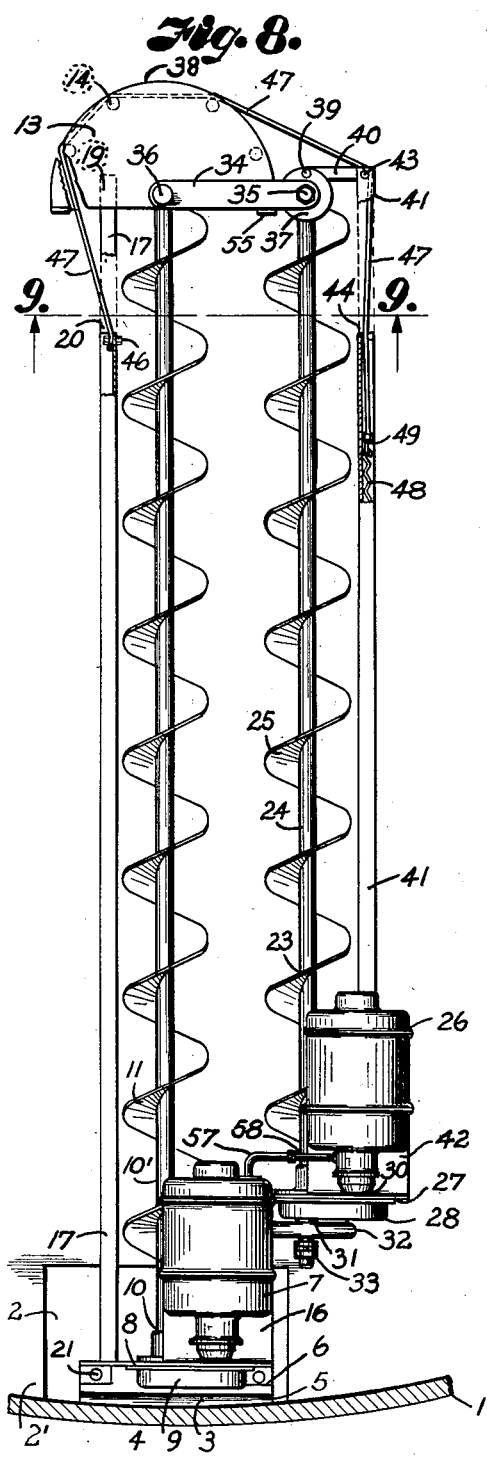
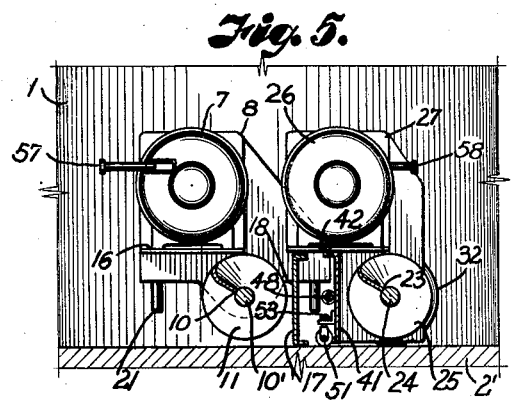
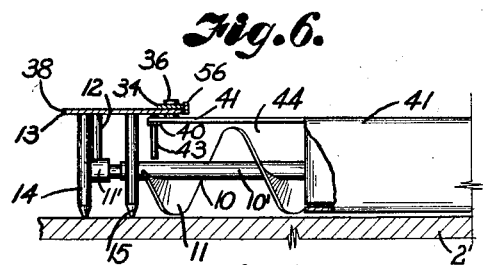
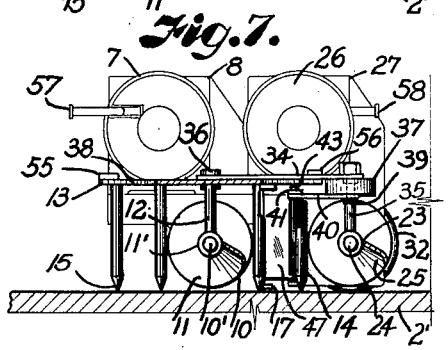
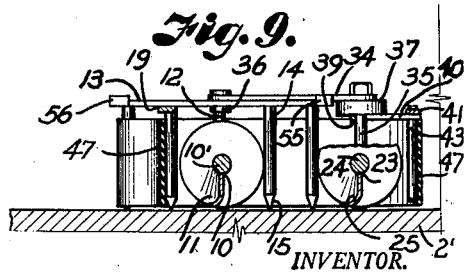

2,790,563

APPARATUS FOR CLEANING FLAT BOTTOM GRAIN TANKS WITH SIDE DRAW-OFF

Edwin L. McCarthy, Kansas City, Mo.

Application October 8, 1954, Serial No. 461,105

9 Claims. (Cl. 214—17)

The invention relates to apparatus for cleaning flat bottom grain tanks, and more particularly to a pivotally connected auger mechanism for use in the bottom of the tank having an opening therein near the side thereof to remove the grain from the tank through said opening.

Heretofore, various apparatus including augers have been employed to remove grain or other material from the bottom of bins, tanks or the like which will not flow out by gravity through the draw-off opening or hole. Usually the opening has been in the center of the tank or bin so that the auger would be rotatable around the opening to remove the grain from the floor thereof. No one prior to the present invention so far as applicant is aware has provided an auger arrangement for removing grain or the like from a bin where the opening is in the bottom at one side of the bin.

It is, therefore, the principal object of the present invention to provide an auger mechanism for the removal of grain which will not flow by gravity through the bottom opening of the tank wherein a second auger is pivoted to the support for one end of the first auger and adapted to rotate therearound in substantially a complete circle.

Other objects of the present invention are to provide an auger for attachment to the side of a grain bin or the like provided with a motor for rotating the auger and the opposite end of the auger being supported by a platform having posts or the like for engaging the bottom of the grain bin for initially moving the grain which will not flow by gravity through the opening in the bottom of the tank; to provide a motor driven second auger having one end pivotally connected to the platform of the first auger and the opposite end being supported by a wheel for rotation about the bottom of the grain tank when the motor is in operation; to provide troughs alongside the respective augers for guiding of the grain to the opening in the bottom of the tank, the trough for the first auger having an opening near the platform end thereof, the grain trough for the second auger also having an opening near the platform end so that operation of the second auger will carry the grain toward the platform end of the first auger and the grain be deposited through the opening in the trough so that the first auger will carry the grain to the opening in the bottom of the grain tank; to provide means having one end connected to the first trough and the other end carried by the second trough whereby grain will be guided into the trough opening and being prevented from flowing to the clean surface behind the second auger; to provide resilient means for the grain guiding means so that when the second auger is rotated about its pivot the said means will be extended to follow the auger around the platform and to guide the grain to the first auger; to provide stop means for the respective motors for deenergizing said motors upon completion of cleaning of the tank; and to provide a device of this character which will successfully clean the grain from the bottom of a grain tank which will not flow therefrom by gravity.

In accomplishing these and other objects of the present invention, I have provided improved details of structure the preferred forms of which are illustrated in the accompanying drawings, wherein:

Fig. 1 is a plan view of my apparatus shown in the bottom of a grain tank in position where part of the tank has been cleaned.

Fig. 2 is a plan view of my invention with parts broken away to better illustrate the structure.

Fig. 3 is a fragmentary cross-sectional view of the motor driven end of the second auger.

Fig. 4 is a fragmentary cross-sectional view of the mounting on the first auger and motor to the side of the grain bin over the door opening.

Fig. 5 is a cross-sectional view taken on a line 5—5, Fig. 2.

Fig. 6 is a cross-sectional view taken on a line 6—6, Fig. 2.

Fig. 7 is a cross-sectional view taken on a line 7—7, Fig. 2.

Fig. 8 is a plan view of the apparatus particularly illustrating the second or auxiliary auger in the position after the floor of the tank has been cleaned.

Fig. 9 is a cross-sectional view particularly illustrating the platform support and the belt for guiding of the grain to the troughs.

Referring more in detail to the drawings:

1 designates a grain tank or the like having an opening 2 in the bottom 2' for removal of material therefrom, the opening being near one side of the tank. An L-shaped bracket 3 is secured to the side of the grain bin by bolts or the like 4. Mounted on the flange 5 of the bracket is a plate 6 for mounting of a motor 7 through a framework structure 8 including chain gears (not shown) in a housing 9 for operating an auger 10 with a shaft 10' having spirals 11 for moving of the grain through the opening 2 as will later be shown. The outer end of the shaft 10' engages in a bearing 11' secured to a depending arm 12 of a platform 13 of substantially semicircular shape. The platform is supported by a plurality of posts 14 having pointed lower ends 15 for engaging the bottom 2' of the grain tank to prevent slippage thereon.

The motor 7 is supported by a plate 16 secured to the framework 8 and secured to the framework 8 and extending along one side of the auger 10 is a trough 17 for guiding of the grain moved by the spirals 11 of the auger when the motor is operating to drive said auger. The trough 17 is shown as being substantially U-shaped with one flange thereof welded or otherwise secured to the frame 8 as indicated at 18 (Fig. 5) and has its opposite ends welded or otherwise secured to the platform 13 as indicated at 19 (Fig. 2). The end of the trough near the platform is cut away as indicated at 20 for a purpose later described.

With the invention thus far described, when it is desired to clean a grain tank bottom the auger 10 with its motor is placed inside of the tank usually through an opening (not shown) in the side thereof and the motor frame 8 through the plate 6 is secured to the flange 5 of the bracket 3 by pins or the like 21 engaging in openings 22 in said flange 5. The motor end of the auger 10 is placed directly over the opening 2 and its outer end extended to substantially the center of the tank where the posts 14 will contact the grain and the platform 12 rest on top thereof. Energization of the motor 7 will rotate the auger 10 in a clockwise direction, the spirals 11 thereof being placed so that the grain will be moved toward the opening 2. As the auger rotates the platform 12 will sink toward the floor 2' of the tank and the ends of the posts come to rest thereon when the grain is removed therefrom. When all of the grain has been removed which the auger 10 will reach, a second auger 23 is placed alongside the auger 10 as best illustrated in Fig. 2, The second auger assembly 23 comprises a shaft 24 and spirals 25 so arranged that they will move the grain in the opposite direction to the spirals on the auger 10. The motor 26 is mounted on a framework structure 27 including a gear housing 28 for rotating shaft 24 through chain 29 engaging gears on the auger shaft 24 and the motor shaft 30. Shaft 24 of the auger extends outwardly from the gear housing 29 and comprises an axle 31 for a wheel 32 for supporting the outer end of the auger 23 with its motor and driving mechanism and having a friction clutch 33 at the outer end of the axle.

The opposite end of the shaft 24 is pivotally mounted on an arm 34 through pin 35 at one end thereof and the opposite end of the arm being pivotally mounted on a pin 36 extending through the platform 3 as best illustrated in Fig. 2. A turnplate 37 secured to the pin 35 which secures the auger shaft 24 to the plate 34 and follows around the circular edge 38 of the platform 12 when the device is in operation as will later be shown. Secured to one side of the turnplate 37 by a pin 39 is an arm 40 which engages on the underneath side of the turnplate 37 as best illustrated in Fig. 7.

A grain trough 41 is provided for the auger 23 and has one end secured to a motor mounting plate 42, Fig. 3, and its other end secured to the arm 40 by a bolt or the like 43. The end of the trough near the pivoted end of the auger 23 is also provided with an opening 44 as best illustrated in Fig. 6 to cooperate with the opening 20 in the trough 17.

Secured to the trough 17 at the edge of the opening 20 thereof by bolts or the like 46 is a belt or the like 47 substantially the same width as the trough which is adapted to engage over and connect the edge of the opening 44 in the trough 41 and extends along the inner side of the trough 41 when the trough is in the position shown in Fig. 2. The belt has its opposite ends secured to a coil spring 48 as indicated at 49 and the opposite end of the coil spring is secured to the trough near the motor mounting as indicated at 50, Fig. 2, to provide tension on the belt and prevent the grain from filtering or passing between the troughs upon operation of the augers.

In order to give further support to the auger 23 I have provided two dolly wheels 51 and 52 with frames 53 and 54 welded or otherwise suitably secured to the inside of the trough 41 substantially underneath the motor 26.

In operation of the two augers as thus far described energization of the motor 26 will cause the auger 23 to rotate in a counterclockwise direction, the spirals 25 carrying the grain toward the center of the tank and through the opening 44 of the grain trough 41 and through the opening 20 in the grain trough 17 where the auger 10 will pick up the grain and carry it to the opening 2 in the bottom of the tank. The auger 10 is operated in a clockwise direction so as to carry the grain to the opening. As the auger 23 rotates it will be forced into the grain by the rotation of the wheel 32 through the friction clutch 33. The auger 23 will rotate or revolve about the pivot bolt 35 and eat its way into the grain and augering the grain toward the center of the bin and to auger 10 as above stated. The auger 23 will pivot about the pivot pin 25 without movement of the arm 34 for a distance of about 90 degrees and then it will revolve about the pin 36 because of the pull on the auger in a straight line from pin 36. The pin 36 functions at the pivot point for the auger 23 for the next 180 degrees until the arm 34 engages a stop 55 on the corner of the platform as illustrated in Fig. 2. There is also a stop 56 on the opposite corner of the platform to prevent the arm from passing from the platform when it is on the side of the auger 10 or in the position shown in Fig. 2.

The belt 47 is a principal feature of the present invention and operates to close valve opening 44 in the trough 41 to prevent the grain from going back to the clean portion of the floor as the auger 23 moves therearound as best illustrated in Fig. 1. It will be obvious however that the belt guides the grain through the opening 44 until the auger assumes a substantially straight line position with auger 10 or until the belt contacts the leg 14 on the corner of the platform and then as the auger continues around the platform the belt contacts the remaining leg and also the pin 43 which extends below the arm 20 as best illustrated in Fig. 9. In other words, the openings act as valves for the grain to pass through and the belt operates as a closure for the valve.

A stop switch arm 57 is provided on the motor 7 and motor 26 is provided with a stop switch arm 58 so that when the arms contact, both motors will be deenergized to stop the mechanism.

It will be obvious from the foregoing that I have provided an improved auger arrangement whereby the grain which will not flow by gravity out of an opening in the bottom of a grain tank at the sides thereof may be removed whereby one end of auger is pivoted with respect to the one end of the other and a belt arrangement is provided for the grain troughs to guide the grain from one auger to the other.

What I claim and desire to secure by Letters Patent is:

1. In combination with a storage tank having a discharge opening in the bottom near one side thereof, an auger, means for mounting one end of said auger over said opening, means rotating said auger, means for supporting the free end of said auger, a second auger pivotally mounted on said supporting means for the free end of the first auger, a means supporting the free end of the second auger, means including a motor for rotating said second auger and said wheel, a grain trough for the first auger carried by the means for supporting said auger, the outer end of the trough having an opening for passage of grain therethrough from the second auger, a grain trough for the second auger having one end supported by the supporting means therefor, an opening in said trough near the outer end thereof, means for securing the free end of the second trough to the means for supporting the free end of the first auger, grain directing means extending between the opening in the first trough and the second trough near the motor mounting and over the edge of the opening in the second trough whereby said motor will cause the second auger to move the grain through said openings in the troughs to the first auger and rotation of said last-named auger will carry the grain to the floor opening.

2. In combination with a storage tank having a discharge opening in the bottom near one side thereof, an auger, means for mounting one end of said auger over said opening, means for rotating said auger, a platform for supporting the free end of said auger, a second auger, means pivotally mounting said second auger on said platform, a wheel for supporting the free end of the second auger, means including a motor for rotating said second auger and said wheel, a grain trough for the first auger carried by the means for supporting said auger and by said platform, the outer end of the trough having an opening for passage of grain therethrough from the second auger, a grain trough for the second auger having one end supported by the wheel supporting means, means for securing the other end of said trough to the means for supporting the free end of the first auger, an opening in said trough near the outer end thereof, grain directing means connected to said troughs and extending over the openings in the first and second troughs whereby operation of said motor will cause the second auger to move the grain through said openings in the trough to the first auger and rotation of said first auger will carry the grain to the floor opening.

3. In combination with a storage tank having a discharge opening in the bottom near one side thereof, an auger, means for mounting one end of said auger over said opening, means for rotating said auger, means for supporting the free end of said auger, a second auger pivotally mounted on said supporting means for the free end of the first auger, a wheel for supporting the free end of the second auger, means including a motor for rotating said second auger and said wheel, a grain trough for the first auger carried by the means for supporting said auger, the outer end of the trough having an opening for passage of grain therethrough from the second auger, a grain trough for the second auger having one end supported by the wheel supporting means, an opening in said trough near the outer end thereof, means for securing the free end of the second trough to the means for supporting the free end of the first auger, and means connected to the edge of the opening in the first auger and to the second auger whereby the grain from said augers will be directed away from the cleared surface of the floor, and the second auger will move the grain through said openings in the troughs to the first auger and rotation of said last-named auger will carry the grain to the floor opening.

4. In combination with a storage tank having a discharge opening in the bottom near one side thereof, an auger, means for mounting one end of said auger over said opening, means for rotating said auger, a platform for supporting the free end of said auger, a second auger, means pivotally mounting said second auger on said platform, a wheel for supporting the free end of the second auger, means including a motor for rotating said second auger and said wheel, a grain trough for the first auger carried by the means for supporting said auger and by said platform, the outer end of the trough having an opening for passage of grain therethrough from the second auger, a grain trough for the second auger having one end supported by the wheel supporting means, means for securing the free end of the second trough to the mounting means for the second auger on said platform, an opening in such trough near the outer end thereof, and means connected to the edge of the opening in the first auger and to the second auger whereby the grain from said augers will be directed away from the cleared surface of the floor, and the second auger will move the grain through said openings in the troughs to the first auger and rotation of said last-named auger will carry the grain to the floor opening.

5. In combination with a storage tank having a discharge opening in the bottom near one side thereof, an auger, means for mounting one end of said auger over said opening, means for rotating said auger, a platform for supporting the free end of said auger, a second auger, means pivotally mounting said second auger on said platform, a wheel for supporting the free end of the second auger, means including a motor for rotating said second auger and said wheel, a grain trough for the first auger carried by the means for supporting said auger and by said platform, the outer end of the trough having an opening for pasage of grain therethrough from the second auger, a grain trough for the second auger having one end supported by the wheel supporting means, means for securing the free end of the second trough to the mounting means for the second auger on said platform, an opening in such trough near the outer end thereof, and resilient means connected to the edge of the opening in the first auger and to the second auger whereby the grain from said augers will be directed away from the cleared surface of the floor, and the second auger will move the grain through said openings in the troughs to the first auger and rotation of said last-named auger will carry the grain to the floor opening.

6. Apparatus for removing grain from a storage tank having a discharge opening in the bottom near one side thereof, an auger, means for mounting one end of said auger over said opening, means for rotating said auger, a substantially semicircular plate for supporting the free end of said auger, legs for said plate, an arm pivotally secured to said plate, a second auger, means pivotally mounting the second auger on the free end of said arm including a turnplate for following the semicircular portion of said plate, a wheel for supporting the free end of the second auger, means including a motor for rotating said second auger and said wheel, a grain trough for the first auger carried by the means for supporting said auger, the outer end of the trough having an opening for passage of grain therethrough from the second auger, an arm on said turnplate, a grain trough for the second auger having one end supported by the wheel supporting means and its other end to said last-named arm, an opening in such trough near the outer end thereof, whereby operation of said motor will cause the second auger to move the grain through said openings in the troughs to the first auger and rotation of said last-named auger will carry the grain to the floor opening.

7. Apparatus for removing grain from a storage tank having a discharge opening in the bottom near one side thereof, an auger, means for mounting one end of said auger over said opening, means for rotating said auger, a substantially semicircular plate for supporting the free end of said auger, legs for said plate, an arm pivotally secured to said plate, a second auger, means pivotally mounting the second auger on the free end of said arm including a turnplate for following the semicircular portion of said plate, a wheel for supporting the free end of the second auger, means including a motor for rotating said second auger and said wheel, a grain trough for the first auger carried by the means for supporting said auger, the outer end of the trough having an opening for passage of grain therethrough from the second auger, an arm on said turnplate, a grain trough for the second auger having one end supported by the wheel supporting means and its other end to said last-named arm, an opening in such trough near the outer end thereof, a belt of a width substantially equal to said troughs, means securing one end of the belt to the edge of the opening in the first trough, said belt extending over the edge of the opening in the second auger and extending along the inside of said trough, and resilient means securing the free end of the belt to said second trough near said motor mounting, said belt being of a length with said tensioning means to allow said belt to extend around the legs of said plate and close the opening in the second trough to prevent the grain from moving to the cleaned floor surface.

8. Apparatus for removing grain from a storage tank having a discharge opening in the bottom near one side thereof, an auger, means for mounting one end of said auger over said opening, means for rotating said auger, a substantially semicircular plate for supporting the free end of said auger, legs for said plate, an arm pivotally secured to said plate, a second auger, means pivotally mounting the second auger on the free end of said arm including a turnplate for following the semicircular portion of said plate, a wheel for supporting the free end of the second auger, a friction clutch for said wheel, means including a motor for rotating said second auger and said wheel, a grain trough for the first auger carried by the means for supporting said auger, the outer end of the trough having an opening for passage of grain therethrough from the second auger, an arm on said turnplate, a grain trough for the second auger having one end supported by the wheel supporting means and its other end to said last-named arm, said means including a downwardly extending pin, an opening in said trough near the pivoted end thereof, a belt of a width substantially equal to said troughs, means securing one end of the belt to the edge of the opening in the first trough, said belt extending over the edge of the opening in the second auger and extending along the inside of said trough, and resilient means securing the free end of the belt to said second trough near said motor mounting, said belt being of a length with said tensioning means to allow said belt to extend around the legs of said plate and said pin securing the second trough to said arm on the turnplate and close the opening in the second trough to prevent the grain from moving to the cleaned floor surface after the auger has passed thereover.

9. Apparatus for removing grain from a storage tank having a discharge opening in the bottom near one side thereof, an auger, means for mounting one end of said auger over said opening, means for rotating said auger, a substantially semicircular plate for supporting the free end of said auger, legs for said plate, an arm pivotally secured to said plate, a second auger, means pivotally mounting the second auger on the free end of said arm including a turnplate for following the semicircular portion of said plate, a wheel for supporting the free end of the second auger, a friction clutch for said wheel, means including a motor for rotating said second auger and said wheel, a grain trough for the first auger carried by the means for supporting said auger, the outer end of the trough having an opening for passage of grain therethrough from the second auger, an arm on said turnplate, a grain trough for the second auger having one end supported by the wheel supporting means and its other end to said last-named arm, said means including a downwardly extending pin, an opening in said trough near the pivoted end thereof, grain directing means having one end secured to the edge of the opening in the first trough and extending over the edge of the opening in the second auger and along the inside of said trough and having its other end secured to the second trough near said motor mounting, said means extending around the legs of said plate and said end securing the second trough to said arm on the turnplate and closing the opening in the second trough to prevent the grain from moving to the clean floor surface after the auger has passed thereover.

References Cited in the file of this patent

UNITED STATES PATENTS

| | | |
|---|---|---|
| 1,482,524 | Robinson | Feb. 5, 1924 |
| 2,037,959 | Bean | Apr. 21, 1936 |
| 2,058,125 | Bean | Oct. 20, 1936 |